(12) United States Patent
Counts et al.

(10) Patent No.: US 11,951,934 B2
(45) Date of Patent: Apr. 9, 2024

(54) SAFETY CUTTING DEVICES FOR VEHICLE SEAT BELTS

(71) Applicants: Paulette Counts, Midland, MI (US); Curt Tucker, Saginaw, MI (US)

(72) Inventors: Paulette Counts, Midland, MI (US); Curt Tucker, Saginaw, MI (US)

(*) Notice: Subject to any disclaimer, the term of this patent is extended or adjusted under 35 U.S.C. 154(b) by 0 days.

(21) Appl. No.: 17/814,060

(22) Filed: Jul. 21, 2022

(65) Prior Publication Data

US 2022/0402456 A1    Dec. 22, 2022

Related U.S. Application Data (63) Continuation-in-part of application No. 16/867,864, filed on May 6, 2020, now abandoned.

(51) Int. Cl.
*B60R 22/32* (2006.01)

(52) U.S. Cl.
CPC ........ *B60R 22/32* (2013.01); *B60R 2022/327* (2013.01); *B60R 2022/328* (2013.01)

(58) Field of Classification Search
CPC . B60R 22/32; B60R 2022/328; B26B 25/005; B26B 25/007
See application file for complete search history.

(56) References Cited

U.S. PATENT DOCUMENTS

| | | | | |
|---|---|---|---|---|
| 4,009,905 A * | 3/1977 | Bejeannin | ............... | B60R 22/32 244/122 B |
| 4,680,861 A * | 7/1987 | Meurer | ................... | B60R 22/32 248/37.3 |
| 5,588,212 A * | 12/1996 | Riihimaki | ............... | B60R 22/32 30/296.1 |
| 9,499,122 B2 * | 11/2016 | Nowak | .................. | B60R 22/322 |
| 10,486,543 B2 * | 11/2019 | Matsuo | ............. | H01M 8/04619 |
| 2008/0155838 A1 * | 7/2008 | Bergstrand | ............ | B26B 25/005 30/294 |
| 2008/0222900 A1 * | 9/2008 | Lee | ......................... | B60R 22/32 30/298.4 |
| 2014/0245873 A1 * | 9/2014 | Nowak | ................. | B60R 22/322 83/639.4 |
| 2019/0016296 A1 * | 1/2019 | Daniel | .................... | B60R 22/32 |
| 2019/0329264 A1 * | 10/2019 | Krus | ..................... | B02C 18/182 |

FOREIGN PATENT DOCUMENTS

| | | | | |
|---|---|---|---|---|
| CN | 111959431 A | * | 11/2020 | ............ B60R 22/32 |
| DE | 3615124 A1 | * | 1/1987 | |
| DE | 3440382 C2 | * | 2/1987 | |
| DE | 3619650 A1 | * | 12/1987 | |
| DE | 19708339 A1 | * | 1/1998 | ............. B26B 27/00 |
| DE | 202006002320 U1 | * | 5/2007 | ........... B26B 25/005 |
| FR | 2581915 A1 | * | 11/1986 | |
| GB | 1596307 A | * | 8/1981 | ............ B60R 22/32 |
| JP | 2017109579 A | * | 6/2017 | |
| KR | 0138152 Y1 | * | 5/1999 | ............ B60R 22/32 |
| KR | 20170060811 A | * | 6/2017 | |
| KR | 20180001854 U | * | 6/2018 | |
| WO | WO-8807948 A1 | * | 3/1988 | |
| WO | WO-03089278 A1 | * | 10/2003 | ............. A62B 3/005 |
| WO | WO-2006109106 A1 | * | 10/2006 | ............ B60R 22/32 |
| WO | WO-2013115931 A1 | * | 8/2013 | ............... B60N 2/01 |

\* cited by examiner

*Primary Examiner* — Barry Gooden, Jr.

(57) ABSTRACT

Safety cutting devices for vehicle seat belts, in which the device is attached to the insertable components of such a seat belt. In this manner, the device is always readily available for use in an emergency situation.

5 Claims, 10 Drawing Sheets

SAFETY CUTTING DEVICES FOR VEHICLE SEAT BELTS

CROSS-REFERENCE TO RELATED APPLICATIONS

This application is a continuation-in-part application from U.S. utility patent application Ser. No. 16/867,864 filed May 6, 2020, from which priority is claimed.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

This invention deals with a safety cutting device for vehicle seat belts, in which the device is attached to the insertable tang (tools definition) of such a seat belt. In this manner, the device is always readily available for use in an emergency situation such as a crash, fire, or the like.

Generally, in crash situations, it is common for vehicles to overturn and maintain belted occupants in an upside-down position in which the occupant literally hangs from the safety belt. In such a situation, it is common for persons involved to become disoriented and not in control of the situation and therefore, not have the wherewithal to locate a device for releasing the seat belt, especially if it is stored in a compartment of the vehicle away from the belt.

In addition, quite often in vehicle crashes, the seat belt mechanism can become jammed, or the occupant does not have ready availability to the release mechanism for the belt.

In all such cases, there is a need for a belt release that is attached directly to the working end of a seat belt so that it is handy and readily available to the seat occupant. In addition, there is a need for a device that is easily useable.

Most of the prior art deals with emergency belt release and one such U.S. patent is U.S. Pat. No. 9,499,122 issued to Nowak, et al on Nov. 22, 2016, deals with a device for emergency cutting off fastened seatbelts featuring a bushing-shaped housing with an explosive charge or a gas generator inside for releasing a cutting mechanism.

U.S. Pat. No. 10,486,643 that issued to Raybon on Nov. 26, 2019, deals with an emergency escape tool which is a housing mounted on the side of the vehicle seat that contains a slot and a blade in the slot to sever the seat belt.

U.S. Pat. No. 4,680,861 that issued on Jul. 21, 1987, to Meurer deals with a cutter that has a flat body portion containing a protected blade that is set into a slit in the flat body.

BRIEF SUMMARY OF THE INVENTION

Thus, what is claimed and disclosed here is an auto safety belt release. The auto safety belt release comprises a housing, wherein the housing has a bottom portion and a top portion. The bottom portion has located in it, supported by a stanchion, a cutting disc, the cutting disc being centered in the housing.

The bottom portion has two parallel sides, each such side having a bottom edge, each bottom edge turned inward to form a narrow lip. The bottom portion has a first elongated channel above each lip and the bottom portion has two elongated grooves, one such groove on either side of the stanchion.

The housing has a cutting track assembly in the bottom portion, the cutting track having a second elongated channel centered in the cutting track assembly. There are two protrusions in a top surface of the cutting track assembly located on either side of the cutting track, wherein there two v-channels are oppositely opposed to the protrusions. The cutting track is slidably held in the first elongated channels.

The top portion of the auto safety belt release is vertically slidable from said bottom portion of the auto safety belt release. The top portion is detachedly locked to the bottom portion by at least two topical lock pins.

The auto safety belt release is attached to a base, wherein the base has at least four through openings for fasteners to attach the base to a safety belt metal tang.

In another embodiment, there is an auto safety belt release as described Supra, in which the top portion has at least two downwardly directed pegs that insert in openings in a base to lock the auto safety belt release in place.

In yet another embodiment, there is a method of releasing an auto safety belt, the method comprising providing an auto safety belt release device as described just Supra, attached to an auto safety belt, lifting the top portion of the auto safety belt release device, and moving the auto safety belt release device across the auto safety belt.

In still another embodiment, there is an auto safety belt release assembly comprising a housing, where the housing has a bottom component and a top component. The bottom component is comprised of a tray configuration having four walls, four openings for use as alignment points, and a bottom, the bottom having a first centered elongated opening in it.

The top component has two side walls and a front-end wall, the top component having a second centered, elongated opening in it. The top component has a movable handle mounted in a back end of the top component on a moveable plate. The moveable handle has an opening in it for a support shaft for supporting the handle. The movable plate is slidably moveable within a top of the top component.

There is a sharpened blade fixture mounted under the moveable plate, the sharpened blade being moveable simultaneously with the moveable plate.

There is a removable safety pin for locking the handle, the pin mounted in an opening in the handle.

In addition, there is a further auto safety belt release assembly comprising a housing having a bottom, a front-end and a back end. The front end has a seat belt tang attached to it and the back end has a two-slot wall comprising a first slot and a second slot that allows the passage of a seat belt into the housing through the first slot and out of the housing through the second slot.

The bottom has two spaced-apart posts, namely, a back post and a front post, both the first post and the second post have slotted tops.

There is an elongated piston, the piston positioned in the slotted tops, the elongated piston has a spring surrounding an outside surface.

The elongated piston has a back end and a front end. The front end has a sharpened blade attached to it. There is a circumferential channel in the elongated piston near the back end.

There is a firing pin mounted through an opening in the housing in alignment with the circumferential channel, the firing pin passing into the circumferential channel.

DETAILED DESCRIPTION OF THE INVENTION AND DRAWINGS

Figures 1, 2:
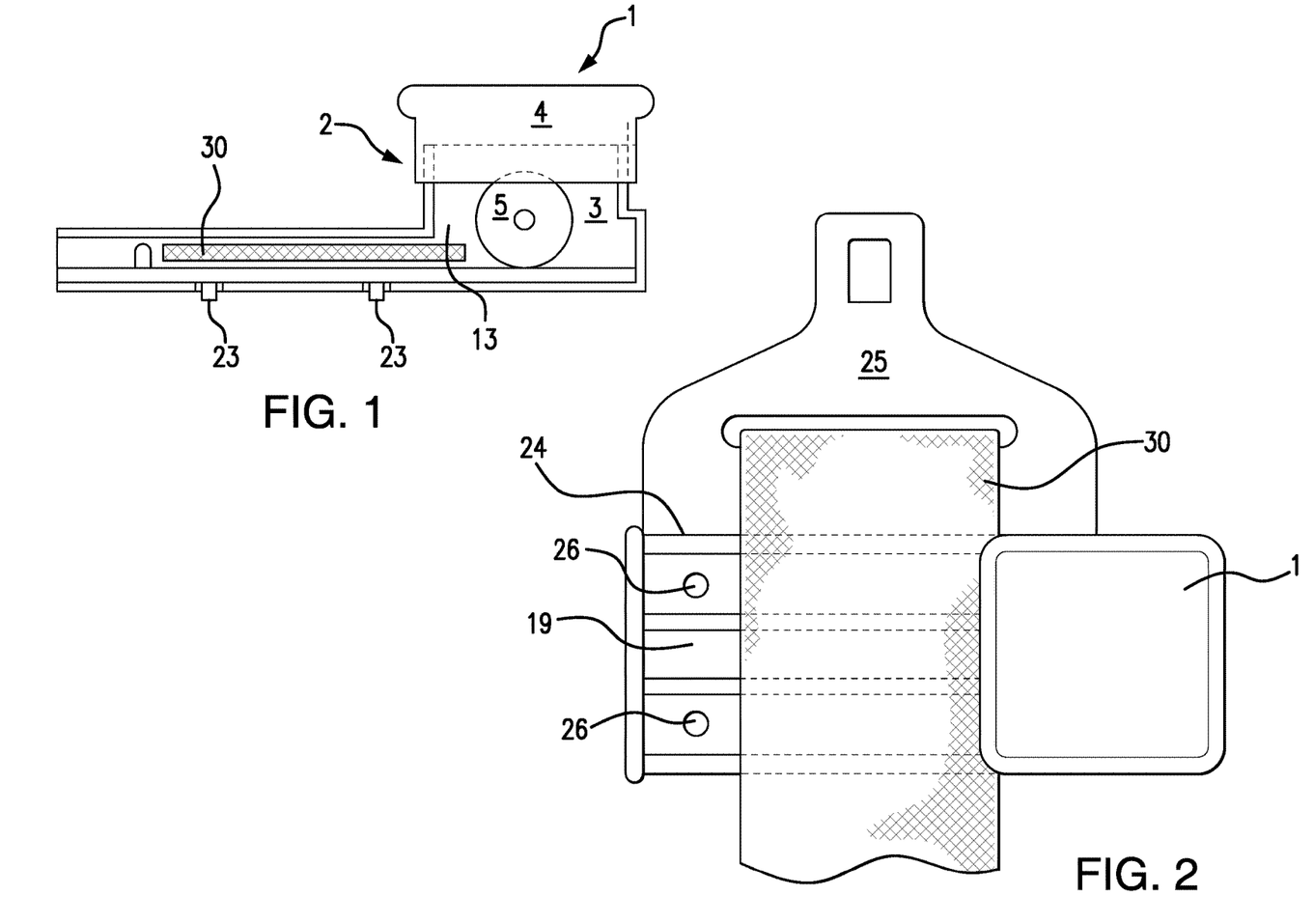
FIG. 1 is a full side view of the device of this invention.
FIG. 2 is a full top view of the device of this invention mounted on the end of a safety belt attachment.
Figure 3:
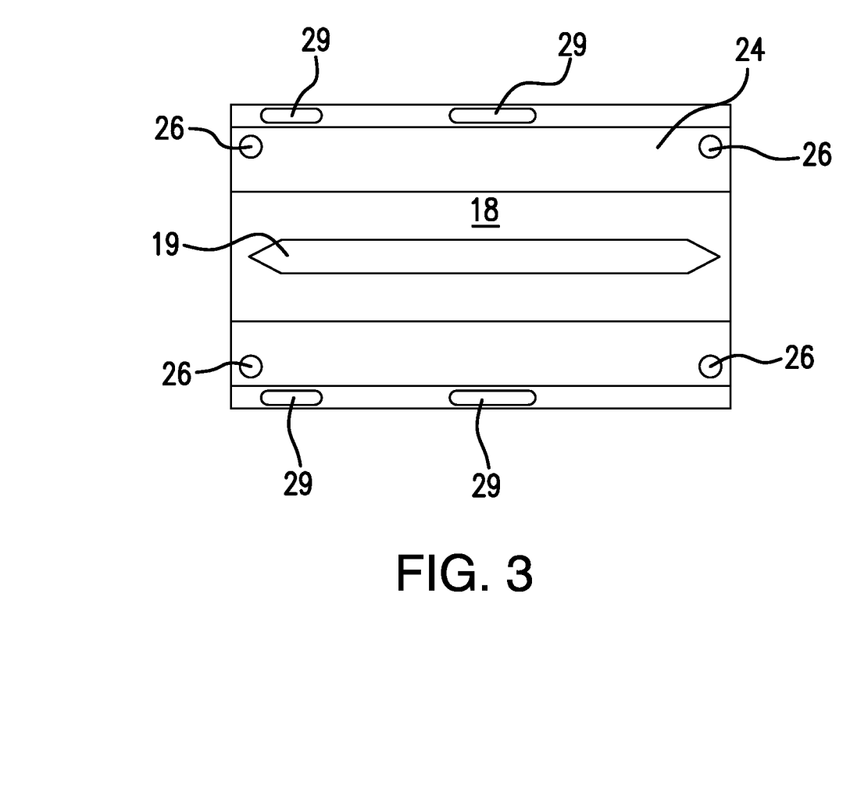
FIG. 3 is a full top view of the bottom portion of the device of this invention.
Figure 6:
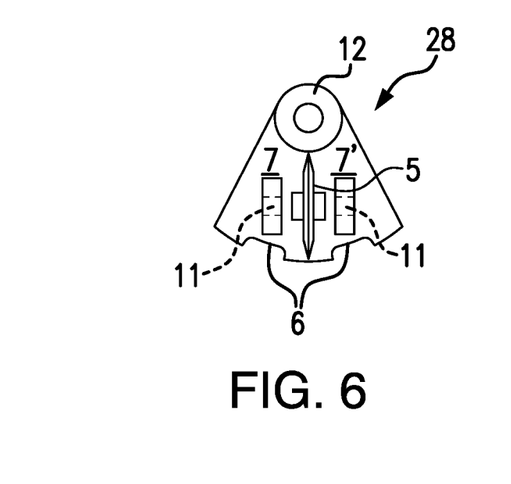
FIG. 6 is a full end view of the top portion of this device.
Figure 7:
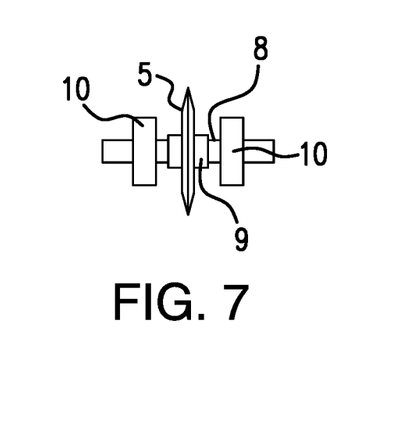
FIG. 7 is a full view of the arrangement of the cutting wheel of this device and its support in the stanchion.
Figure 8A:
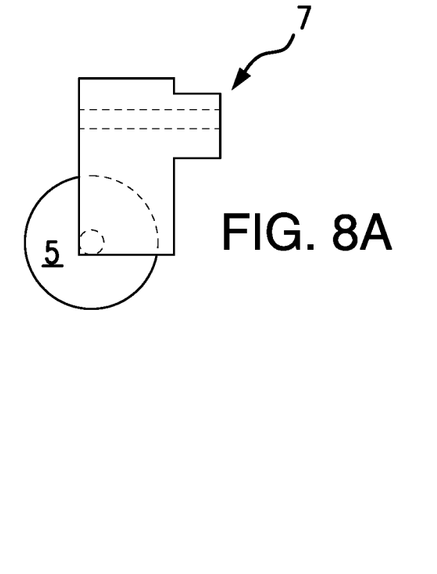
FIG. 8A is a right side of the arrangement of FIG. 7.
Figure 8B:
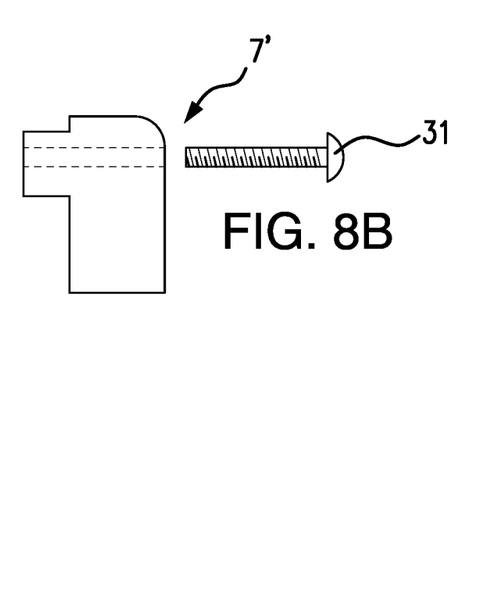
FIG. 8B is a left side of the arrangement of FIG. 7.

Turning now to FIG. 1 which is a full side view of a device of this invention, which is an auto safety belt release 1, there is a housing 2 comprised of a bottom portion 3 and a top portion 4. The bottom portion 3 has a cutting disc 5 centered therein. With reference to FIGS. 6, 7, 8A and 8B, there is shown the supporting structure 28 for the cutting disc 5 comprised of a stanchion 6 comprised of two halves 7 and 7'. When fit together as shown in FIG. 6, they are held together containing an axle 8, an axle washer bearing mount 9, and a fastener 10 on each side of the cutting disc 5, located on the axle 8. There are two small screw holes 11, one on each side of the disc 5, and a snap fitting 12. The device is held together by threaded bolt 31 (FIG. 8A).

Turning to FIG. 1 there is shown the bottom portion 3 having two sides 13 and 13' (13' not shown in this Figure, but is identical to 13, see FIG. 4) wherein each side has a bottom edge 14 (FIG. 4), wherein the bottom edges 14 are turned inward to form a narrow lip 15 and 15'. As can be observed from FIG. 4, the lips 15 and 15' serve to support the cutting track.

Figure 4:
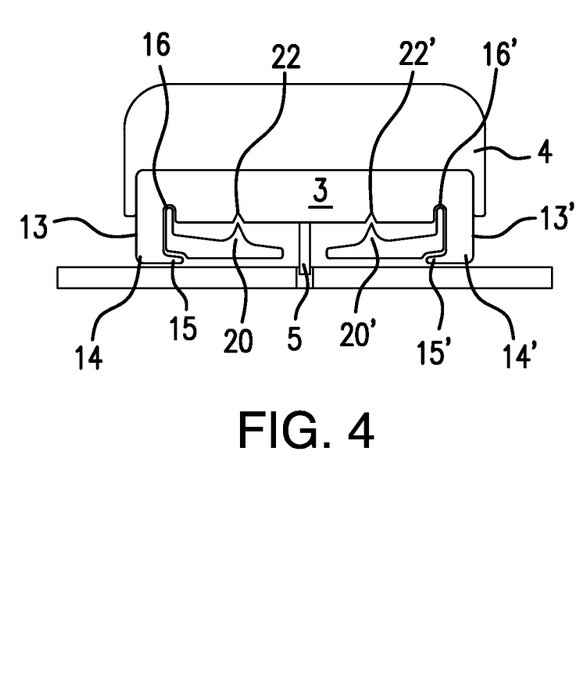
FIG. 4 is an full end view of a device of this invention.

There is an elongated groove 16 and 16', one on either side of the stanchion 6 and above each lip 15 and 15'. These grooves serve to guide the release 1 as it is moved across the seat belt. In addition, the bottom portion 3 has two v-channels 22 and 22' oppositely opposed to the protrusions 20 and 20', one on each side of the stanchion 6 as shown in FIG. 4. These protrusions fit into the v-channels to help guide the release 1 when it is moved across the seat belt.

The housing 2 contains a cutting track assembly 18 in the bottom portion 3. The cutting track assembly 18 has a second elongated channel 19 centered in it to allow for the passage of the cutting disc 5. It has two protrusions 20 and 20' (FIG. 4) in a top surface 21 of the cutting track assembly 18 located on either side of the cutting track 18. The cutting track assembly 18 is slidably held in the first elongated channels 16 and 16'.

Figure 5:
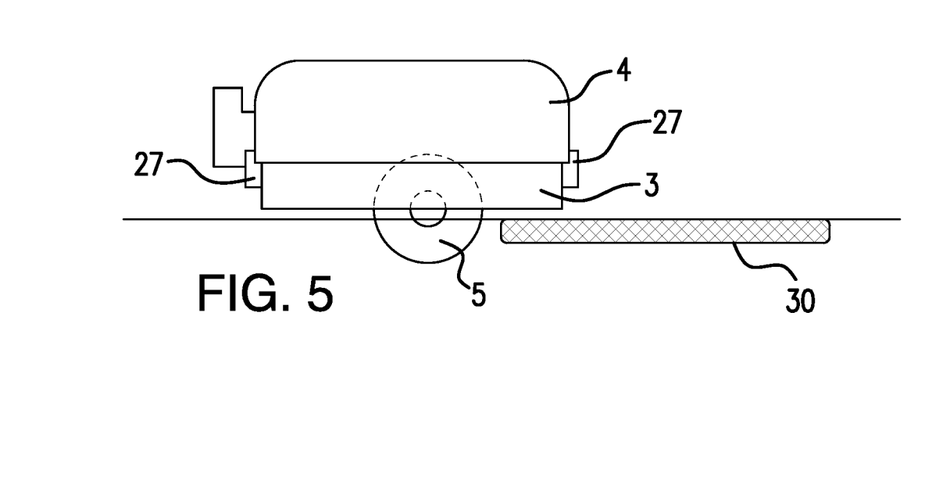
FIG. 5 is a side view of the device of this invention and a seat belt adjacent thereto.

The top portion 4 of the auto safety belt release 1 is vertically slidable from the bottom portion 3 of the auto safety belt release 1. The top portion 4 is detachedly locked to the bottom portion by snap locks 27 (FIG. 5).

The auto safety belt release 1 is attached to a base 24, wherein the base 24 has at least four through openings 26 for fasteners (not shown) to attach the base 24 to a safety belt metal tang 25 (the tang and safety belt not being part of the instant invention).

In this first embodiment of the instant invention, there is a means of attaching the top portion 4 to the bottom portion 3 which is two topical lock pins 27.

There is a means of retaining the auto safety belt release 1 in the unused position, namely, pegs 23 in cavities 29.

A safety belt 30, which is not part of this invention is shown in FIGS. 1, 2, 5, 9, and 11.

In use, the auto safety belt release is retained in a position adjacent to a safety seat belt and is securely fastened to the seat belt tang 25. In use, a person would lift the top portion 4 of the auto safety belt release which releases the auto safety belt release from the base and allows the auto safety belt release to move across the seat belt wherein the cutting disc 5 cuts through the belt. If necessary, the device can be moved several times in a pull/push fashion across the belt if needed for full release.

Figures 9, 10:
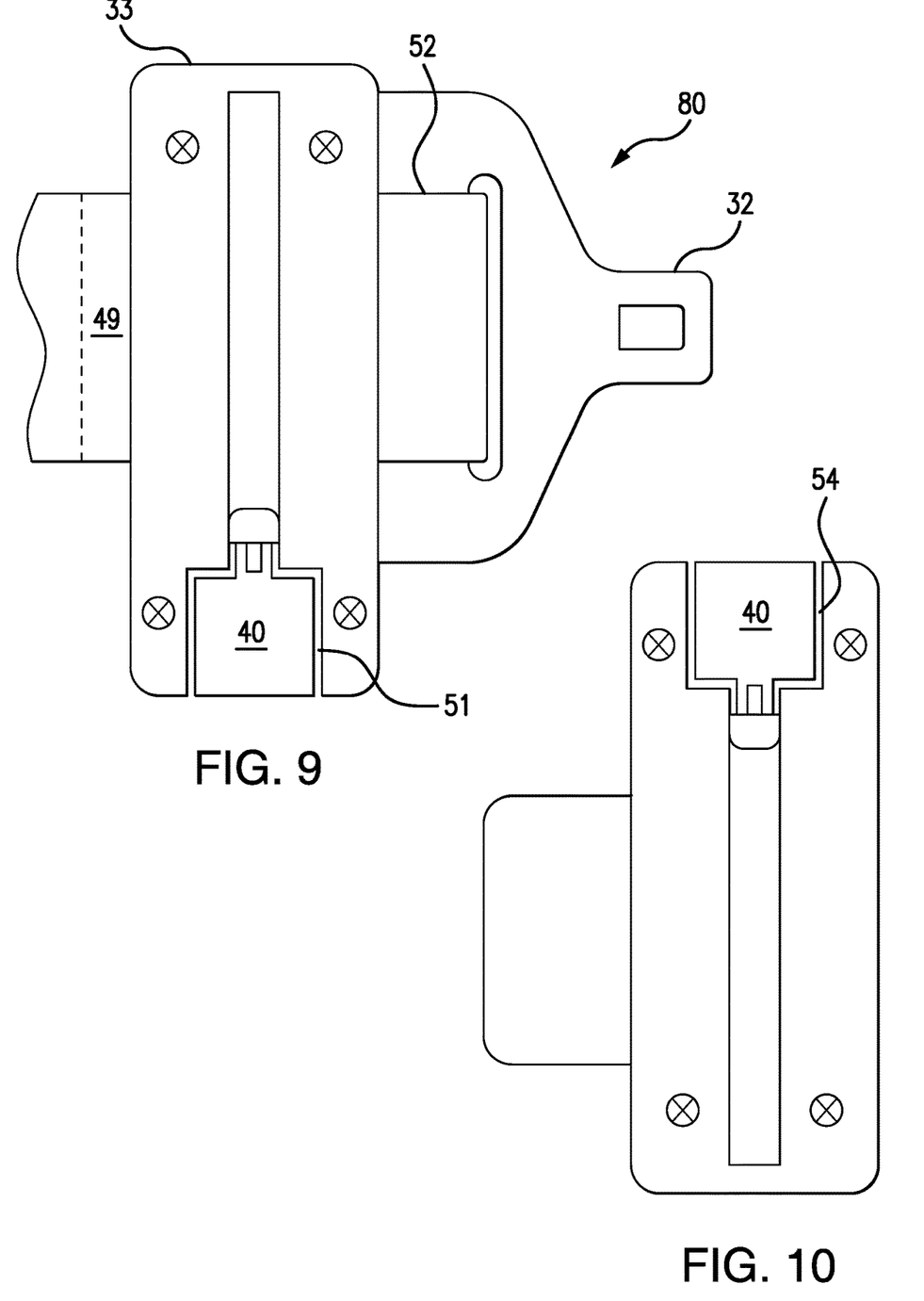
FIG. 9 is a full top view of a draw blade device of this invention showing a tang configuration.
FIG. 10 is a full top view of a draw blade device of this invention showing a female receiver for a tang configuration.

Turning now to another embodiment of an auto safety belt release assembly, there is shown in FIG. 9 a full top view of such a device 80 in which the cutting arrangement is a draw blade in a housing.

Figure 16:
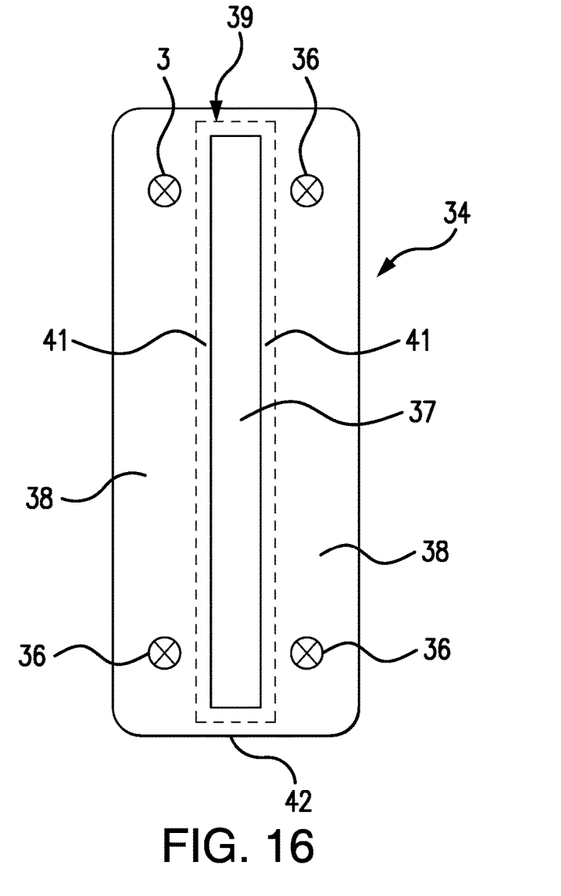
FIG. 16 is a full top view of the bottom component of the device of FIG. 9.
Figure 17:
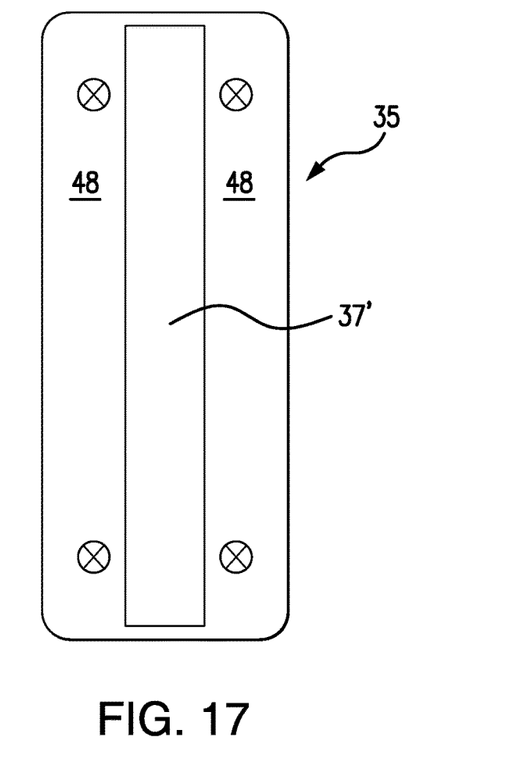
FIG. 17 is a full inside view of the top of the device of FIG. 9.

There is shown a seat belt tang 32 for coupling the device to a female receiver (shown in FIG. 10). The device is comprised of a housing 33 that has a bottom component 34 shown in FIG. 16 and a top component 35 shown in FIG. 17. The two components have openings 36 that are used to couple the two components together using bolts (not shown). The tang 32 can be separately attached to the housing 33 or it can be molded into the housing 33 upon manufacture. Both the bottom component 34 and the top component 35 are tray configurations having walls.

Each of the components 34 and 35 have elongated shallow grooves (bottom=37 and top=37', FIGS. 16 and 17) in them to accommodate slidable components discussed infra.

The top component 35 has two side walls 38 that are recessed (see 41 in FIG. 16) and a front-end wall 39. The top component 35 has a movable handle 40 mounted in the back end 42 and it is mounted on a moveable plate assembly 43 (see FIG. 19).

Figure 11:
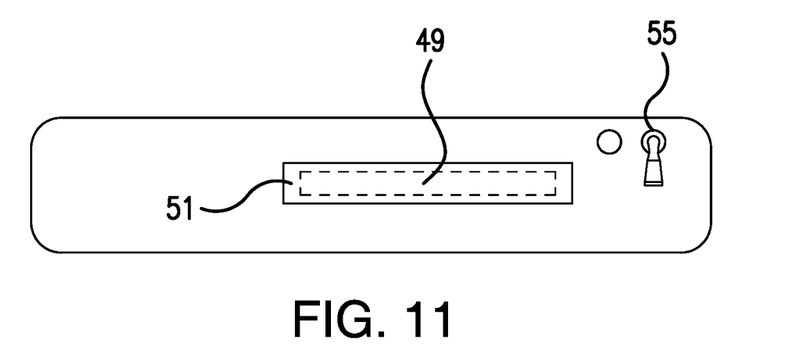
FIG. 11 is a full side view of the device of FIG. 9 showing the side slots with the safety belt in place.
Figure 13:
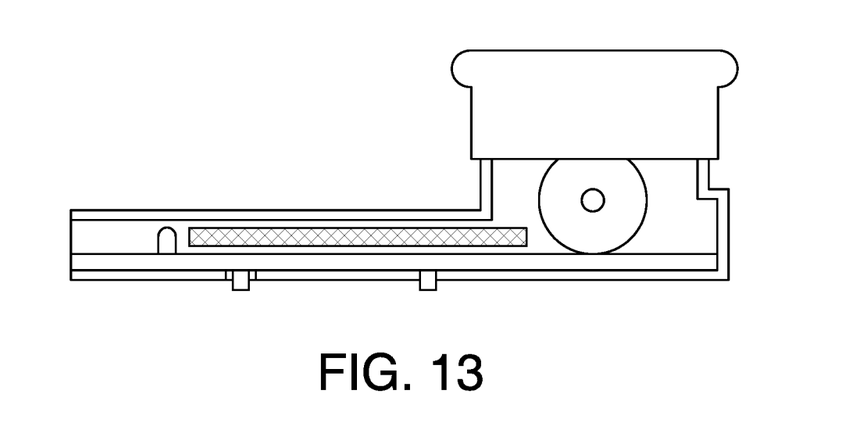
FIG. 13 is a full end view of the device of FIG. 9.
Figure 18A:
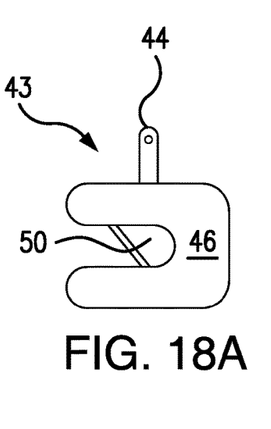
FIG. 18A is a full side view of the cutting blade and holder of the device of FIG. 9 without the handle.
Figure 18B:
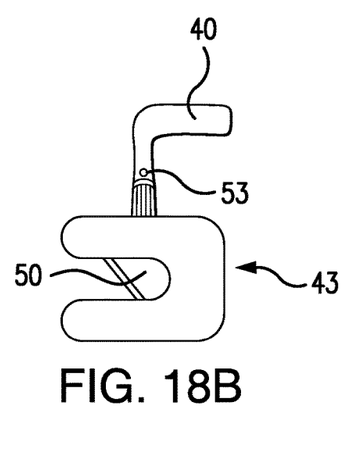
FIG. 18B is a full side view of the cutting blade and holder of the device of FIG. 9 with the handle in place.
Figure 19:
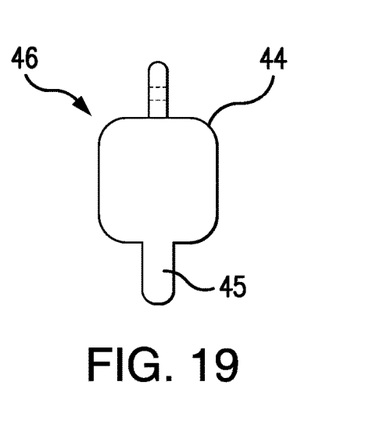
FIG. 19 is a full back view of the component of FIGS. 18a and 18B.

Turning to FIG. 19, the moveable plate assembly 43 is comprised of a mounting stanchion 44 surmounted on a moveable plate 46 and a stud 45 is mounted on the bottom of the moveable plate 46. The stud 45 moves in the elongated shallow groove 36 when the handle of the device is moved. (See FIG. 18B). The shoulders 48 of the moveable plate 46 prevent the assembly from ejecting from the device. The handle 40 is mounted on the mounting stanchion 44 using a pin 53 and the handle 40 can rotate about 90 degrees from a resting position. A sharp blade 50 is mounted in the moveable plate assembly 43 as shown in FIGS. 18A and 18B. The handle 40 snaps into place in an indentation 54 in the back of the top component 35 until necessary for use. In use, one snaps the handle 40 upright and pulls the handle 40 across the belt which cuts the belt A seat belt 49 is attachable to the device by feeding the seat belt 49 through an open slot 51 (FIG. 11) into the device and then through slot 52 (see FIG. 9) and then under the device and reattaching to the original belt thus positioning the belt in a position to be cut by the sharpened blade 50 if necessary. FIG. 11 shows a side view of the assembly with a seat belt in place. FIG. 13 is a full end view of the device of this invention as described just Supra. There is shown a bottom component 34, a top component 35 and the tang 32.

FIG. 18A shown a full side view of a device with the sharpened blade 50 mount therein. Also shown is the stanchion. FIG. 18b shows the same configuration with the handle attached and in the vertical position.

An alternative safety device can be built into this device.

Figure 12:
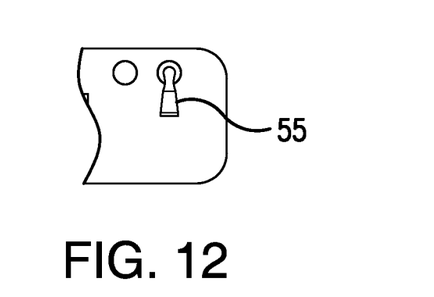
FIG. 12 is a view of a portion of the side wall of the device of FIG. 9 showing the opening for the axle for the handle and the safety pin.

This alternative device is a safety pin 55 (FIG. 12) which is also inserted into an opening 56 (see FIG. 12 and FIG. 18B) in the handle 40.

Figure 14:
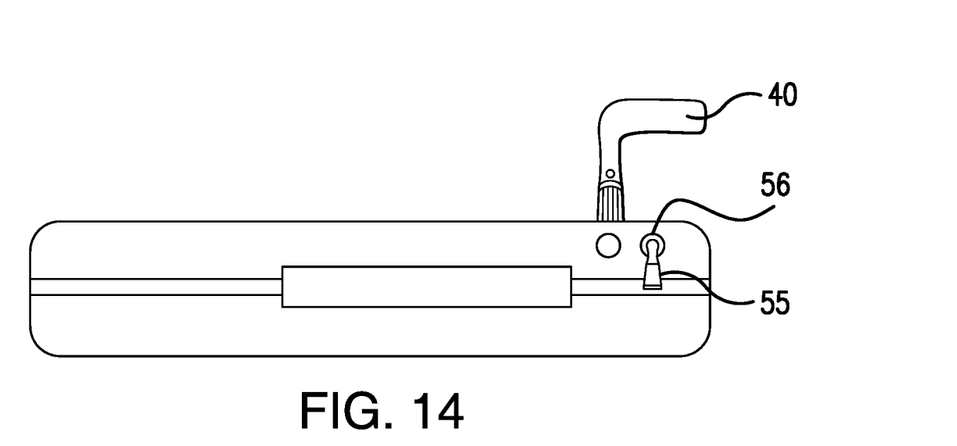
FIG. 14 is a full side view of the device of FIG. 9 showing the handle (trigger) for the draw mechanism in the starting position.
Figure 15:
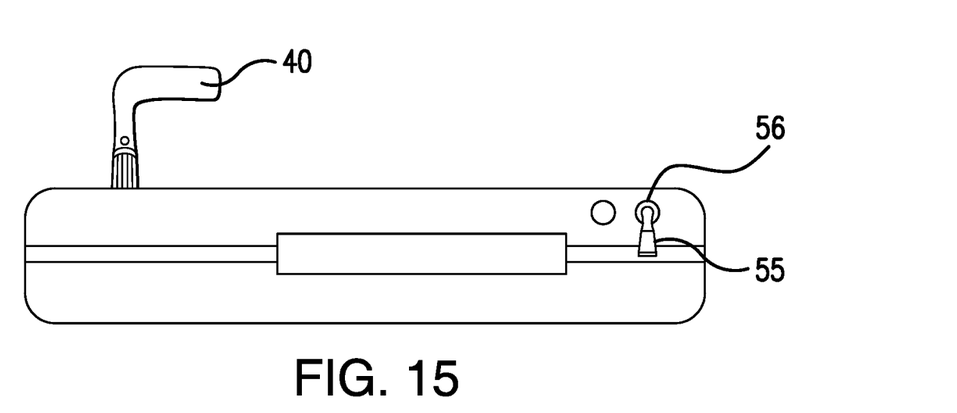
FIG. 15 is a full side view of the device of FIG. 9 showing the handle for the draw mechanism in the finishing position.

FIG. 14 is a full side view of the assembly showing the handle 40 in an upright position ready to draw the blade across the seat belt and FIG. 15 is a full-size view showing the completion of drawing the assembly across the seat belt.

FIG. 10 is a full top view of a device of this invention wherein it is coupled to a female receiving portion 76 of a seat belt device. All of the device components are identical to that just defined Supra except for the receiving device being substituted for the tang 32.

Figure 20:
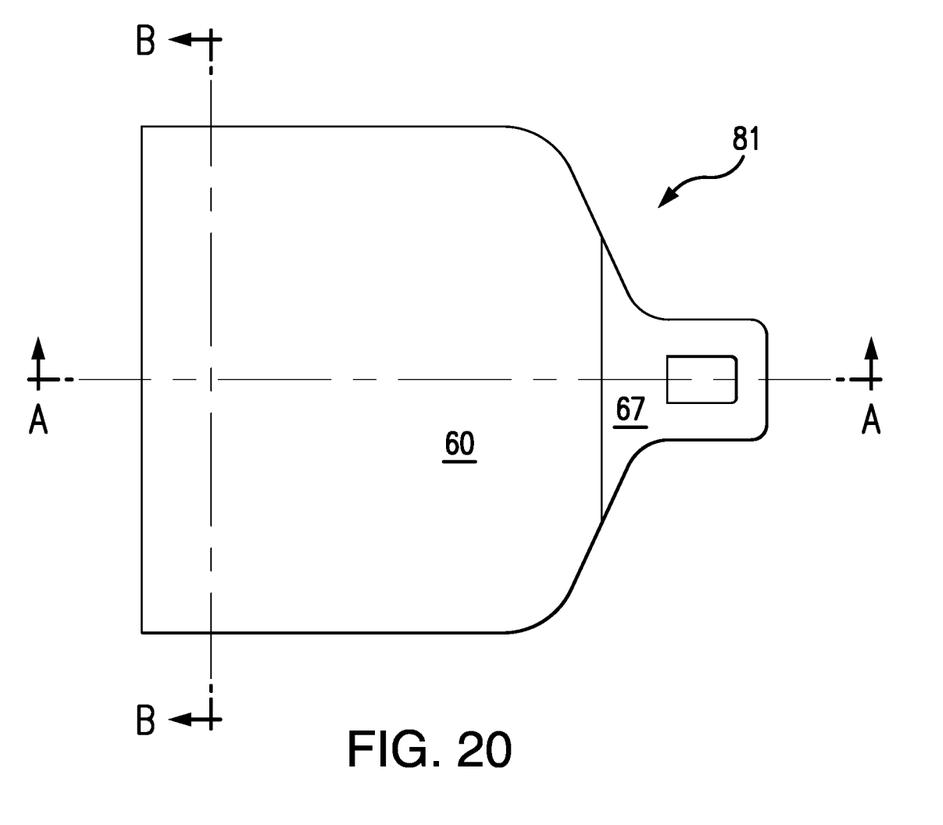
FIG. 20 is a full top view of the piston version of a device of this invention showing a tang configuration.
Figure 21:
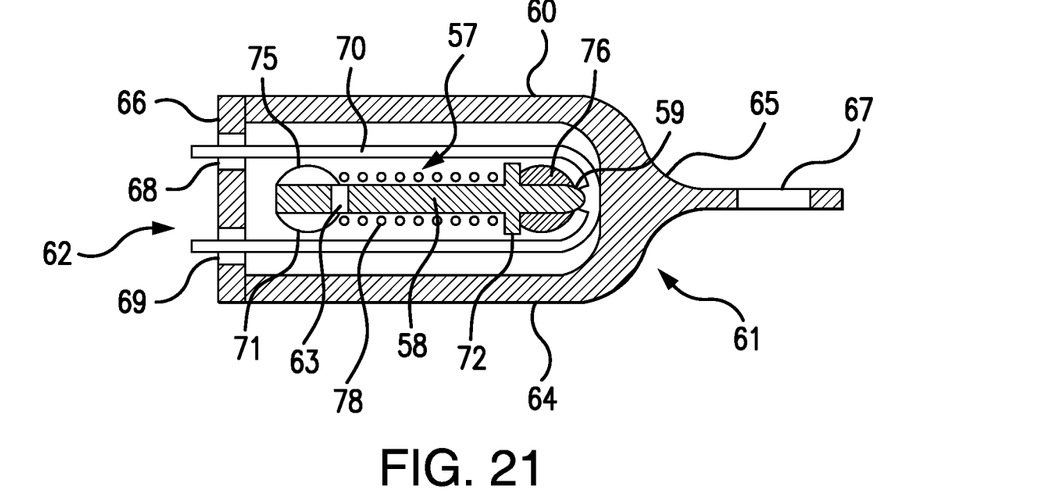
FIG. 21 is a cross sectional side view of the device of FIG. 20 though line A-A.

Turning now to another embodiment of this invention, there is a device 81 that contains an activable piston assembly 57 wherein there is a pin anchored elongate piston 58 having a sharpened blade 59 attached to the piston 58 at one end, encased in a housing 60 as shown in FIGS. 20 and 21.

Figure 22:
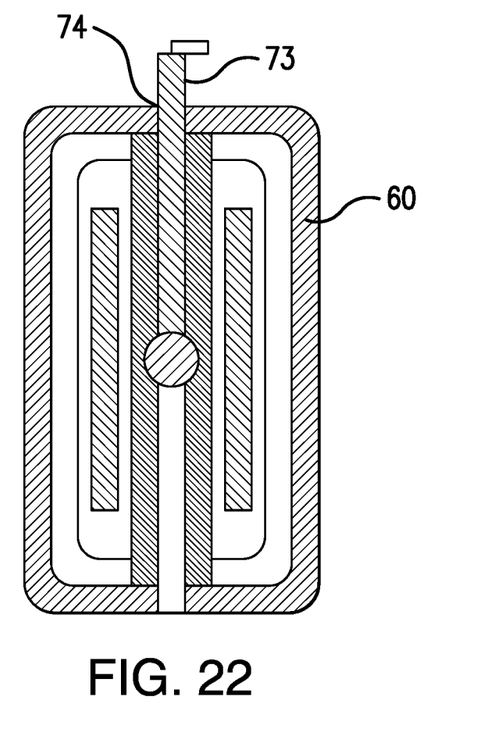
FIG. 22 is a cross sectional end view of the device of FIG. 20 through line B-B.
Figure 23:
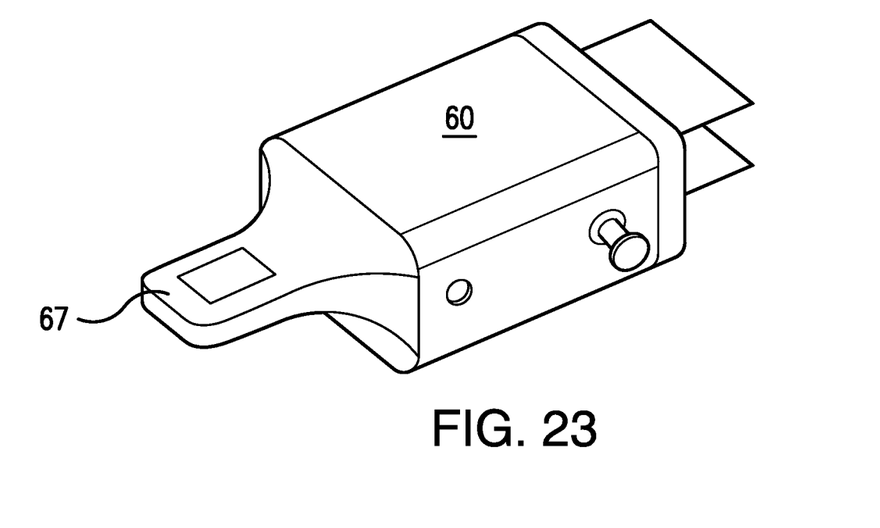
FIG. 23 is a view in perspective of the piston device of this invention showing the tang configuration.

The housing 60 consists of bottom 64, a front end 65, and back end 66 as shown in FIG. 21. the front end 65 has a seat belt tang 67 attached to it, and this can be mechanically attached or can be molded into the housing 60. The back end 66 has a two-slot wall comprising a first slot 68 and a second slot 69 as shown in FIG. 22. These slots allow the passage of a seat belt 70 into the housing 60 through the first slot 68 and out of the housing 60 through the second slot 69 which allows the seat belt 70 to be positioned in front of the pin anchored elongate piston 58 sharp end.

The bottom 64 has two spaced-apart posts, namely, a back post 71 and a front post 72 and both of the posts have a slotted top.

The activable piston has a first end 61 and a second end 62 and near the second end 62, there is a circumferential groove 63 in the piston. This groove is the stop or holding position for the pin anchored elongate piston 58. The activable piston has the sharpened blade 59 attached to the front end.

The activatable piston has a spring 76 surrounding it on an outside surface and in a ready mode, the spring 78 is held under tension by two restraining segments 75 and 76. (see FIG. 21).

There is a firing pin 73 mounted through an opening 74, the firing pin 73 being in alignment with the circumferential groove 63 where the piston 58 is held in a safety mode until needed.

In an emergency need to release the seat belt 70, the pin 73 is pulled which releases the piston 58 which urges forward and cuts the seat belt 70. The safety mode with the pin in the circumferential mode is shown in FIG. 22 while the fired mode for the piston is shown in FIG. 21.

Figure 24:
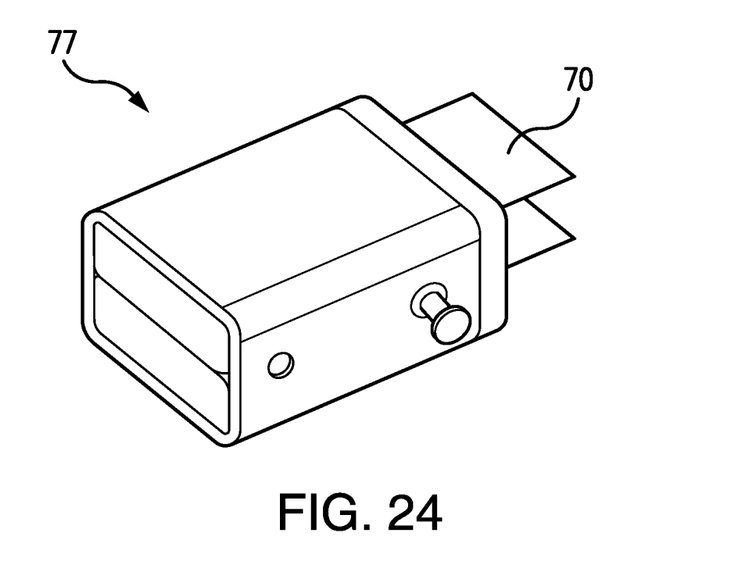
FIG. 24 is a view in perspective of the piston device of this invention showing the female receiver configuration.

Also contemplated within this invention is an auto safety belt release described just Supra, in which the tang is replaced by a female seat belt receiver 77 as shown in FIG. 24.

What is claimed is:

1. An auto safety belt release, said auto safety belt release comprising:
    a housing, said housing having a bottom portion and a top portion, said bottom portion having located therein, supported by a stanchion, a cutting disc, said cutting disc being centered in said housing;
    said bottom portion having two parallel sides, each said side having a bottom edge, each said bottom edge turned inward to form a narrow lip, said bottom portion having a first elongated channel above each said lip;
    said bottom portion having elongated grooves, one of said grooves on either side of said stanchion;
    said housing having a cutting track assembly in said bottom portion, said cutting track assembly having a second elongated channel centered in said cutting track assembly, there being two protrusions in a top surface of said cutting track assembly located on either side of said cutting track assembly, there being two v-channels oppositely opposed to said two protrusions, said cutting track assembly being slidably held in said first elongated channels;
    said top portion of said auto safety belt release being vertically slidable on said bottom portion of said auto safety belt release, said top portion being detachedly locked to said bottom portion by at least two topical lock pins;
    said auto safety belt release attached to a base, said base having at least four through openings for fasteners to attach said base to a safety belt metal tang.

2. A method of releasing an auto safety belt, the method comprising providing an auto safety belt release device as claimed in claim 1, attached to said auto safety belt;
    lifting said top portion of said auto safety belt release device;
    moving said auto safety belt release across said auto safety belt.

3. The auto safety belt release as claimed in claim 1 wherein, in addition, said top portion has at least two downwardly directed pegs that insert in concavities in a base to retain said auto safety belt release in place.

4. A method of releasing an auto safety belt, the method comprising providing an auto safety belt release device as claimed in claim 3, attached to said auto safety belt;

lifting said top portion of said auto safety belt release device;

moving said auto safety belt release across said auto safety belt.

5. An auto safety belt release assembly, said auto safety belt release assembly comprising:

a housing having a bottom, a front end and a back end, said front end having a seat belt tang attached thereto, said back end having a two-slot wall comprising a first slot and a second slot that allows the passage of a seat belt into said housing through said first slot and out of said housing through said second slot;

said bottom having two spaced-apart posts, a back post and a front post, both said first post and said second post having slotted tops;

an elongated piston, said piston positioned in said slotted tops, said elongated piston having a spring surrounding an outside surface;

said elongated piston having a back end and a front end, said front end having a sharpened blade attached thereto, there being a circumferential channel in said elongated piston near said back end;

a firing pin mounted through an opening in said housing in alignment with said circumferential channel, said firing pin passing into said circumferential channel.

\* \* \* \* \*